United States Patent
Henze et al.

(10) Patent No.: US 11,970,568 B2
(45) Date of Patent: *Apr. 30, 2024

(54) SKI BOOTS WITH TEMPERATURE-INDEPENDENT MODULUS OF ELASTICITY

(71) Applicant: BASF SE, Ludwigshafen am Rhein (DE)

(72) Inventors: Oliver Steffen Henze, Lemfoerde (DE); Denis Bouvier, Lyons (FR); Henning Wettach, Ludwigshafen am Rhein (DE); Fin Lammers, Lemfoerde (DE)

(73) Assignee: BASF SE, Ludwigshafen am Rhein (DE)

( * ) Notice: Subject to any disclaimer, the term of this patent is extended or adjusted under 35 U.S.C. 154(b) by 742 days.

This patent is subject to a terminal disclaimer.

(21) Appl. No.: 16/972,305

(22) PCT Filed: Jun. 5, 2019

(86) PCT No.: PCT/EP2019/064694
§ 371 (c)(1),
(2) Date: Dec. 4, 2020

(87) PCT Pub. No.: WO2019/234117
PCT Pub. Date: Dec. 12, 2019

(65) Prior Publication Data
US 2021/0230349 A1      Jul. 29, 2021

(30) Foreign Application Priority Data
Jun. 6, 2018   (EP) ..................... 18176321

(51) Int. Cl.
| | | |
|---|---|---|
| C08G 18/32 | (2006.01) | |
| A43B 5/04 | (2006.01) | |
| C08G 18/08 | (2006.01) | |
| C08G 18/10 | (2006.01) | |
| C08G 18/48 | (2006.01) | |
| C08G 18/66 | (2006.01) | |
| C08G 18/76 | (2006.01) | |
| B29D 35/00 | (2010.01) | |
| B29K 75/00 | (2006.01) | |

(52) U.S. Cl.
CPC ........ C08G 18/6674 (2013.01); A43B 5/0486 (2013.01); C08G 18/0895 (2013.01); C08G 18/3206 (2013.01); C08G 18/4808 (2013.01); C08G 18/4854 (2013.01); C08G 18/7671 (2013.01); B29D 35/0009 (2013.01); B29K 2075/00 (2013.01)

(58) Field of Classification Search
CPC ..................................................... B29C 45/00
See application file for complete search history.

(56) References Cited

U.S. PATENT DOCUMENTS

| 2009/0069526 A1* | 3/2009 | Henze ....................... A43B 5/04 |
| | | 528/65 |
| 2015/0266275 A1 | 9/2015 | Scherzer et al. |
| 2015/0284501 A1* | 10/2015 | Wamprecht .............. C08G 2/12 |
| | | 528/58 |
| 2018/0319925 A1 | 11/2018 | Lu et al. |
| 2022/0354213 A1 | 11/2022 | Henze et al. |

FOREIGN PATENT DOCUMENTS

| DE | 101 03 424 A1 | 8/2002 |
| EP | 0 922 552 A1 | 6/1999 |
| WO | WO 2006/029853 A1 | 3/2006 |
| WO | WO 2006/072461 A1 | 7/2006 |
| WO | WO 2007/118827 A1 | 10/2007 |
| WO | 2014/057057 | 4/2014 |
| WO | WO 2015/064140 A1 | 5/2015 |
| WO | WO 2017/079188 A1 | 5/2017 |
| WO | WO 2017/144502 A1 | 8/2017 |

OTHER PUBLICATIONS

U.S. Office Action dated Dec. 19, 2022, in U.S. Appl. No. 17/756,741, 8 pages.
U.S. Appl. No. 17/756,741, filed Jun. 1, 2022, 2022/0354213, Henze et al.
International Search report dated Sep. 12, 2019 in PCT/EP2019/064694 filed Jun. 5, 2019, 3 pages.
Kunststoffhandbuch, Band VII, herausgegeben von Vieweg und Höchtlen, Carl Hanser, Verlag, München 1966, pp. 103-113, 13 pages.
U.S. Office Action dated Feb. 27, 2023, in U.S. Appl. No. 17/756,741, 7 pages.

* cited by examiner

*Primary Examiner* — Thu Khanh T. Nguyen
(74) *Attorney, Agent, or Firm* — Grüneberg and Myers PLLC

(57) ABSTRACT

The present invention relates to a thermoplastic polyurethane (TPU-1) obtained or obtainable by reaction of an isocyanate composition (IZ) comprising MDI with a polyol composition (PZ), wherein the polyol composition (PZ) comprises at least one polyol (P1) and a chain extender (KV1), wherein the polyol (P1) is selected from polytetrahydrofurans having an average molecular weight Mn in the range from 1200 to 2000 g/mol and the chain extender (KV1) is selected from the group consisting of 1,3-propanediol, 1,4-butanediol and 1,6-hexanediol and also to a process for producing a ski shoe or a part of a ski shoe from the thermoplastic polyurethane according to the invention and to the ski shoe or part of a ski shoe per se.

11 Claims, No Drawings

SKI BOOTS WITH TEMPERATURE-INDEPENDENT MODULUS OF ELASTICITY

The present invention relates to a thermoplastic polyurethane (TPU-1) obtained or obtainable by reaction of an isocyanate composition (IZ) comprising MDI with a polyol composition (PZ), wherein the polyol composition (PZ) comprises at least one polyol (P1) and a chain extender (KV1), wherein the polyol (P1) is selected from polytetrahydrofurans having an average molecular weight Mn in the range from 1200 to 2000 g/mol and the chain extender (KV1) is selected from the group consisting of 1,3-propanediol, 1,4-butanediol and 1,6-hexanediol. The invention further relates to ski shoes, preferably ski boots, particularly preferably the outer shell of a ski boot, based on such a thermoplastic polyurethane and processes for producing ski shoes.

The production of ski shoes, for example ski boots, in particular the outer hard shells of ski boots, from thermoplastics by injection molding is common knowledge.

Thus WO 2007/118827A1 discloses ski shoes based on thermoplastic polyurethane obtainable by conversion of isocyanates with isocyanate-reactive compounds having a molecular weight (Mw) between 500 and 10 000 g/mol and chain extenders having a molecular weight between 50 and 499 g/mol, wherein the chain extender employed is a mixture comprising a main chain extender and one or more co-chain extenders.

There is a need in ski boot development especially to reduce the total weight of the ski boot. The wall thickness of the outer shell of the ski boot is thus often reduced.

The profile of requirements of thermoplastic polyurethane suitable for producing such ski boots, in particular the outer shell thereof, is complex. The low temperature properties should be very good, i.e. the material should exhibit sufficient flexibility at the usage temperatures and not break or splinter. The material must also have a very high stiffness so that even at low wall thicknesses a sufficient stiffness of the ski boot is achievable. It is also advantageous when the stiffness varies as little as possible over the temperature range from −30-20° C. since this makes the handling characteristics of the ski boot temperature-independent.

The materials known from the prior art provide only inadequate fulfillment of these requirements. It is accordingly an object of the present invention to develop thermoplastic polyurethanes for producing ski boots which combine a very high stiffness with excellent low-temperature properties.

This object is achieved in accordance with the invention by a thermoplastic polyurethane (TPU-1) obtained or obtainable by reaction of an isocyanate composition (IZ) comprising MDI with a polyol composition (PZ),
wherein the polyol composition (PZ) comprises at least one polyol (P1) and a chain extender (KV1),
wherein the polyol (P1) is selected from polytetrahydrofurans having an average molecular weight Mn in the range from 1200 to 2000 g/mol and the chain extender (KV1) is selected from the group consisting of 1,3-propanediol, 1,4-butanediol and 1,6-hexanediol.

It has now been found that, surprisingly, the combination of the employed isocyanate component and polyol component affords thermoplastic polyurethanes having a profile of properties that is particularly suitable for the production of ski boots. The thermoplastic polyurethanes thus have good low-temperature properties and typically an elastic modulus of greater than 200 MPa.

According to the invention the isocyanate composition (IZ) comprising MDI is reacted with a polyol composition (PZ) which comprises at least one polyol (P1) and a chain extender (KV1). In the context of the present invention the polyol composition (PZ) may comprise further polyols or further chain extenders. The isocyanate component (IZ) too may comprise further isocyanates in addition to MDI.

Thermoplastic polyurethanes are known in principle. They are typically produced by reaction of isocyanates and isocyanate-reactive compounds and optionally chain extenders optionally in the presence of at least one catalyst and/or customary auxiliaries and/or additives. Isocyanates, isocyanate-reactive compounds and chain extenders are also referred to, individually or collectively, as building block components.

According to the invention the polyol component comprises at least the polyol (P1) as the isocyanate-reactive compound. In the context of the present invention the polyol (P1) is selected from polytetrahydrofurans having an average molecular weight Mn in the range from 1200 to 2000 g/mol, preferably from polytetrahydrofurans having an average molecular weight Mn in the range from 1300 to 1700 g/mol, more preferably from polytetrahydrofurans having an average molecular weight Mn in the range from 1400 to 1600 g/mol, for example in the range from 1400 to 1500 g/mol.

It has now been found that, surprisingly, the compositions according to the invention exhibit sufficient hardness to be used for producing ski boots in particular and despite the molecular weight of the employed polyols are readily colorable.

In a further embodiment the present invention accordingly provides a thermoplastic polyurethane as described hereinabove, wherein the polyol (P1) is selected from polytetrahydrofurans having an average molecular weight Mn in the range from 1300 to 1700 g/mol.

However, in the context of the present invention the polyol component may also comprise further isocyanate-reactive compounds.

Further isocyanate-reactive compounds that may be employed in principle include all suitable compounds known to those skilled in the art. It is thus possible in the context of the present invention to employ any suitable diols, for example further polyether diols.

In the context of the present invention the chain extender (KV1) is selected from the group consisting of 1,3-propanediol, 1,4-butanediol and 1,6-hexanediol. It is also possible according to the invention to employ two or more chain extenders, for example mixtures of 1,4-butanediol and a further chain extender. It is preferable in the context of the present invention to employ only one chain extender (KV1).

In the context of the present invention it is preferable to employ 1,4-butandiol as the chain extender. In a further embodiment the present invention accordingly relates to a thermoplastic polyurethane as described hereinabove, wherein the chain extender (KV1) is 1,4-butanediol.

In the context of the present invention the isocyanate composition (IZ) comprising MDI is employed in the production of the thermoplastic polyurethane (TPU-1).

According to the invention 2,2'-, 2,4'- and/or 4,4'-diphenylmethanediisocyanate (MDI) may be employed. It is particularly preferable to employ only 4,4'-MDI.

In a further embodiment the present invention accordingly relates to a composition as described hereinabove, wherein the thermoplastic polyurethane is based on 4,4'-diphenylmethane diisocyanate (MDI).

The thermoplastic polyurethane of the ski shoe according to the invention preferably has a hard phase fraction of greater than 0.4, particularly preferably greater than 0.5. In a further embodiment the present invention accordingly provides a thermoplastic polyurethane as described hereinabove, wherein the thermoplastic polyurethane has a hard phase fraction of greater than 0.40, wherein the hard phase fraction is defined by the following formula:

$$\text{Hard phase fraction} = \left\{ \sum_{x=1}^{x} \left[ (m_{KVx}/M_{KVx}) * M_{Iso} + m_{KVx} \right] \right\} / m_{ges}$$

having the following definitions:
$M_{KVx}$: molar mass of the chain extender x in g/mol
$m_{KVx}$: mass of the chain extender x in g
$M_{Iso}$: molar mass of the employed isocyanate in g/mol
$m_{ges}$: total mass of all starting materials in g
x: number of chain extenders.

The thermoplastic polyurethanes according to the invention preferably have an elastic modulus in the range from 400 to 1100 MPa, more preferably in the range from 800 to 1050 MPa, particularly preferably in the range from 900 to 1000 MPa.

The thermoplastic polyurethanes according to the invention have good low-temperature properties. These may be characterized for example by the Charpy notched impact strength at −30° C.

In another embodiment the present invention also relates to a thermoplastic polyurethane (TPU-1) which has a Charpy notched impact strength at −30° C. according to DIN EN ISO 179-1/1 eA of greater than 10 kJ/m², preferably of greater than 20 kJ/m², more preferably of greater than 30 kJ/m². For example in the context of the present invention the thermoplastic polyurethane may have an elastic modulus of 400 MPa and a notched impact strength at −30° C. in the region of 100 kJ/m² or else at an elastic modulus of 1000 MPa may have a notched impact strength at −30° C. of about 35 kJ/m². It is likewise possible in the context of the present invention for the thermoplastic polyurethane to have an elastic modulus of 1000 MPa and a notched impact strength of 10-20 kJ/m².

To adjust the hardness of the TPU the building block components may be varied within relatively wide molar ratios. Advantageous molar ratios of polyols to total chain extenders to be employed are for example from 1:1 to 1:15, preferably from 1:4 to 1:12, in particular from 1:5 to 1:10, more preferably from 1:5 to 1:8, wherein the hardness of the TPU increases with increasing content of chain extender.

The reaction may be carried out at customary indices, preferably at an index between 950 and 1050, particularly preferably at an index between 970 and 1010, in particular between 980 and 1000, more preferably in the range from 992 to 998. The index is defined as the ratio of the total isocyanate groups employed in the reaction to the isocyanate-reactive groups, i.e. the active hydrogens. An index of 1000 corresponds to one active hydrogen atom, i.e. one isocyanate-reactive function, per isocyanate group. At indices above 1000 more isocyanate groups than OH groups are present. The TPUs may be produced continuously by the known processes, for example using reactive extruders or the belt process by the "one-shot" process or the prepolymer process, or discontinuously by the known prepolymer process. In these processes the components to be reacted may be mixed with one another successively or simultaneously, with immediate onset of reaction. In the extruder process the building block components and optionally catalysts and/or further auxiliary and additive substances are introduced into the extruder individually or as a mixture, for example at temperatures of 100° C. to 280° C., preferably 140° C. to 250° C., and the obtained TPU is extruded, cooled and pelletized.

Catalysts and assistant or additive substances employed for the production of thermoplastic polyurethanes are known per se to those skilled in the art.

In a preferred embodiment catalysts which accelerate especially the reaction between the NCO groups of the diisocyanates and the hydroxyl groups of the isocyanate-reactive compound and the chain extender are tertiary amines, especially triethylamine, dimethylcyclohexylamine, N-methylmorpholine, N,N'-dimethylpiperazine, 2-(dimethylaminoethoxy)ethanol, diazabicyclo[2.2.2]octane; in another preferred embodiment, these are organic metal compounds such as titanate esters, iron compounds, preferably iron(III) acetylacetonate, tin compounds, preferably tin diacetate, tin dioctoate, tin dilaurate or the dialkyltin salts of aliphatic carboxylic acids, preferably dibutyltin diacetate, dibutyltin dilaurate, or bismuth salts in which bismuth is preferably in oxidation states 2 or 3, especially 3. Salts of carboxylic acids are preferred. Preferably employed carboxylic acids are carboxylic acids having 6 to 14 carbon atoms, particularly preferably having 8 to 12 carbon atoms. Examples of suitable bismuth salts are bismuth(III) neodecanoate, bismuth 2-ethylhexanoate and bismuth octanoate.

The catalysts are preferably employed in amounts of 0.0001 to 0.1 parts by weight per 100 parts by weight of the isocyanate-reactive compound. Preference is given to using tin catalysts, especially tin dioctoate.

In addition to catalysts it is also possible to employ customary auxiliaries. Examples include surface-active substances, fillers, further flame retardants, nucleation agents, oxidation stabilizers, lubrication and demolding aids, dyes and pigments, optionally stabilizers, for example against hydrolysis, light, heat or discoloration, inorganic and/or organic fillers, reinforcers and plasticizers. Suitable auxiliary and/or additive substances may be found for example in Kunststoffhandbuch, volume VII, edited by Vieweg and Höchtlen, Carl Hanser Verlag, Munich 1966 (p. 103-113).

Production processes for thermoplastic polyurethanes are disclosed for example in EP 0 922 552 A1, DE 101 03 424 A1 or WO 2006/072461 A1. Production is typically effected on a belt apparatus or in a reactive extruder, but can also be effected on the laboratory scale, for example in a manual casting method. Depending on the physical properties of the components these are all mixed with one another directly or individual components are premixed and/or prereacted, for example to give prepolymers, and only then subjected to polyaddition. In a further embodiment a thermoplastic polyurethane is first produced from the building block components, optionally together with catalyst, into which auxiliaries may optionally also be incorporated. Homogeneous distribution is preferably effected in an extruder, preferably in a twin-screw extruder.

To produce the thermoplastic polyurethanes according to the invention the building block components, preferably in the presence of catalysts and optionally auxiliaries and/or additives, are typically reacted in amounts such that the equivalent ratio of NCO groups of the diisocyanates to the sum of the hydroxyl groups of the employed components is 0.95 to 1.05:1, preferably 0.98 to 1.00:1, more preferably 0.992 to 0.998:1.

Preferably produced according to the invention are thermoplastic polyurethanes where the thermoplastic polyurethane has an average molecular weight (Mw) in the range from 50 000 to 200 000 Dalton, preferably in the range from 80 000 to 120 000 Dalton. The upper limit for the average molecular weight (Mw) of the thermoplastic polyurethanes is generally determined by processability as well as the spectrum of properties desired.

It has surprisingly been found that the combination of the components according to the invention results in the compositions according to the invention having an optimized profile of properties, especially for use in the production of ski shoes or parts of ski shoes. In particular it has surprisingly been found that the elastic modulus undergoes little variation with temperature. This is advantageous since the ski boots then exhibit the same stiffness at different temperatures.

In a further aspect the present invention accordingly also relates to a process for producing a ski shoe or a part of a ski shoe, comprising the steps of
(i) providing a thermoplastic polyurethane (TPU-1) obtained or obtainable by reaction of an isocyanate composition (IZ) comprising MDI with a polyol composition (PZ),
wherein the polyol composition (PZ) comprises at least one polyol (P1) and a chain extender (KV1),
wherein the polyol (P1) is selected from polytetrahydrofurans having an average molecular weight Mn in the range from 1200 to 2000 g/mol and the chain extender (KV1) is selected from the group consisting of 1,3-propanediol, 1,4-butanediol and 1,6-hexanediol;
(ii) producing a ski shoe or a part of a ski shoe from the thermoplastic polyurethane (TPU-1).

The producing of step (ii) may be effected using processes which are customary per se, preferably by injection molding. In a further embodiment the present invention accordingly also relates to a process as described hereinabove, wherein the thermoplastic polyurethane (TPU-1) is processed by injection molding according to step (ii).

Furthermore, the present invention also relates to the use of a thermoplastic polyurethane (TPU-1) obtained or obtainable by reaction of an isocyanate composition (IZ) comprising MDI with a polyol composition (PZ) for the production of ski shoes or parts of ski shoes, wherein the polyol composition (PZ) comprises at least one polyol (P1) and a chain extender (KV1), wherein the polyol (P1) is selected from polytetrahydrofurans having an average molecular weight Mn in the range from 1200 to 2000 g/mol and the chain extender (KV1) is selected from the group consisting of 1,3-propanediol, 1,4-butanediol and 1,6-hexanediol.

In respect of the preferred embodiments the above explanations concerning the preferably employed components are hereby incorporated by reference.

The invention further relates to ski shoes, preferably ski boots, particularly preferably the outer shell of a ski boot, based on the above-described thermoplastic polyurethane. In addition the invention relates to processes for producing ski shoes, preferably ski boots, particularly preferably the outer shell of a ski boot, wherein the thermoplastic polyurethane according to the invention is processed by injection molding to afford a ski shoe, preferably ski boot, particularly preferably the outer shell of a ski boot.

The thermoplastic polyurethanes according to the invention are used for the production of ski shoes, preferably ski boots, in particular the outer shells of ski boots, ski boot heels, cuffs for the shaft of a ski boot and decorative elements. Production of these products using customary injection molding processes is common knowledge.

In a further aspect the present invention accordingly also relates to a ski shoe or part of a ski shoe obtained or obtainable by a process as described hereinabove. In respect of preferred embodiments the above explanations are hereby incorporated by reference.

Further embodiments of the present invention are apparent from the claims and the examples. It will be appreciated that the features of the subject matter/process according to the invention or of the uses according to the invention recited hereinabove and elucidated hereinbelow may be used not only in the combination specified in each case but also in other combinations without departing from the scope of the invention. Thus for example the combination of a preferred feature with a particularly preferred feature or of a feature not characterized further with a particularly preferred feature etc. is thus also encompassed implicitly even if this combination is not mentioned explicitly.

Exemplary embodiments of the present invention are described hereinbelow but are not intended to restrict the present invention. In particular the present invention also encompasses those embodiments that result from the dependency references and hence combinations specified hereinbelow.

1. Thermoplastic polyurethane (TPU-1) obtained or obtainable by reaction of an isocyanate composition (IZ) comprising MDI with a polyol composition (PZ), wherein the polyol composition (PZ) comprises at least one polyol (P1) and a chain extender (KV1), wherein the polyol (P1) is selected from polytetrahydrofurans having an average molecular weight Mn in the range from 1200 to 2000 g/mol and the chain extender (KV1) is selected from the group consisting of 1,3-propanediol, 1,4-butanediol and 1,6-hexanediol.
2. Thermoplastic polyurethane according to embodiment 1, wherein the polyol (P1) is selected from polytetrahydrofurans having an average molecular weight Mn in the range from 1300 to 1700 g/mol.
3. Thermoplastic polyurethane according to embodiment 1 or 2, wherein the chain extender (KV1) is 1,4-butanediol.
4. Thermoplastic polyurethane according to any of embodiments 1 to 3, wherein the thermoplastic polyurethane has a hard phase fraction of greater than 0.40, wherein the hard phase fraction is defined by the following formula:

$$\text{Hard phase fraction} = \left\{ \sum_{x=1}^{x} [(m_{KV_x}/M_{KV_x}) * M_{Iso} + m_{KV_x}] \right\} / m_{ges}$$

having the following definitions:
$M_{KV_x}$: molar mass of the chain extender x in g/mol
$m_{KV_x}$: mass of the chain extender x in g
$M_{Iso}$: molar mass of the employed isocyanate in g/mol
$m_{ges}$: total mass of all starting materials in g
x: number of chain extenders.

5. Process for producing a ski shoe or a part of a ski shoe, comprising the steps of
(i) providing a thermoplastic polyurethane (TPU-1) obtained or obtainable by reaction of an isocyanate composition (IZ) comprising MDI with a polyol composition (PZ),
wherein the polyol composition (PZ) comprises at least one polyol (P1) and a chain extender (KV1), wherein the polyol (P1) is selected from polytetrahydrofurans having an average molecular weight Mn in the range from 1200 to 2000 g/mol and the chain extender (KV1) is selected from the group consisting of 1,3-propanediol, 1,4-butanediol and 1,6-hexanediol;
(ii) producing a ski shoe or a part of a ski shoe from the thermoplastic polyurethane (TPU-1).
6. Process according to embodiment 5, wherein the thermoplastic polyurethane (TPU-1) is processed by injection molding according to step (ii).
7. Process according to embodiment 5 or 6, wherein the polyol (P1) is selected from polytetrahydrofurans having an average molecular weight Mn in the range from 1300 to 1700 g/mol.
8. Process according to any of embodiments 5 to 7, wherein the chain extender (KV1) is 1,4-butanediol.
9. Process according to any of embodiments 5 to 8, wherein the thermoplastic polyurethane has a hard phase fraction of greater than 0.40, wherein the hard phase fraction is defined by the following formula:

$$\text{Hard phase fraction} = \left\{ \sum_{x=1}^{x} \left[ (m_{KVx}/M_{KVx}) * M_{Iso} + m_{KVx} \right] \right\} / m_{ges}$$

having the following definitions:
$M_{KVx}$: molar mass of the chain extender x in g/mol
$m_{KVx}$: mass of the chain extender x in g
$M_{Iso}$: molar mass of the employed isocyanate in g/mol
$m_{ges}$: total mass of all starting materials in g
x: number of chain extenders.
10. Ski shoe or part of a ski shoe obtained or obtainable according to a process according to any of embodiments 5 to 9.
11. Ski shoe or part of a ski shoe according to embodiment 10, wherein the thermoplastic polyurethane has a Charpy notched impact strength at −30° C. according to DIN EN ISO 179-1/1 eA of greater than 10 kJ/m².
12. Use of a thermoplastic polyurethane (TPU-1) obtained or obtainable by reaction of an isocyanate composition (IZ) comprising MDI with a polyol composition (PZ) for the production of ski shoes or parts of ski shoes, wherein the polyol composition (PZ) comprises at least one polyol (P1) and a chain extender (KV1),
wherein the polyol (P1) is selected from polytetrahydrofurans having an average molecular weight Mn in the range from 1200 to 2000 g/mol and the chain extender (KV1) is selected from the group consisting of 1,3-propanediol, 1,4-butanediol and 1,6-hexanediol.
13. Use according to embodiment 12, wherein the polyol (P1) is selected from polytetrahydrofurans having an average molecular weight Mn in the range from 1300 to 1700 g/mol.
14. Use according to either of embodiments 12 or 13, wherein the chain extender (KV1) is 1,4-butanediol.
15. Use according to any of embodiments 12 to 14, wherein the thermoplastic polyurethane has a hard phase fraction of greater than 0.40, wherein the hard phase fraction is defined by the following formula:

$$\text{Hard phase fraction} = \left\{ \sum_{x=1}^{x} \left[ (m_{KVx}/M_{KVx}) * M_{Iso} + m_{KVx} \right] \right\} / m_{ges}$$

having the following definitions:
$M_{KVx}$: molar mass of the chain extender x in g/mol
$m_{KVx}$: mass of the chain extender x in g
$M_{Iso}$: molar mass of the employed isocyanate in g/mol
$m_{ges}$: total mass of all starting materials in g
x: number of chain extenders.

The examples which follow are intended to illustrate the invention but are in no way intended to restrict the subject matter of the present invention.

EXAMPLES

1. Example 1—Raw Materials

Poly PTHF® 1000: Polytetrahydrofuran 1000, CAS number: 25190-06-1, BASF SE, 67056 Ludwigshafen, GERMANY, intermediates division.
Poly PTHF® 2000: Polytetrahydrofuran 2000, CAS number: 25190-06-1, BASF SE, 67056 Ludwigshafen, GERMANY, intermediates division.
1,4-butanediol: butane-1,4-diol, CAS number: 110-63-4, BASF SE, 67056 Ludwigshafen, GERMANY, intermediates division.
Lupranat MET: 4,4'-methylenediphenyl diisocyanate, CAS number: 101-68-8, BASF SE, 67056 Ludwigshafen, GERMANY
Color masterbatch 1: Elastollan Konz 315 F (red), BASF Polyurethanes GmbH, Elastogranstrasse 60, 49448 Lemforde
Color masterbatch 2: Elastollan Konz 530/1 (blue), BASF Polyurethanes GmbH, Elastogranstrasse 60, 49448 Lemförde 2. Example 2—Production of Materials Materials A-N were produced using a ZSK 58 twin-screw extruder from Werner and Pfleiderer Stuttgart with a 48 D screw divided into 12 barrels. Pelletization was carried out using customary underwater pelletization apparatus from Gala (UWG). The formulations for the individual materials are summarized in table 1.
TPU materials having average molar weights of the polyol component greater than 2000 Dalton were not producible.

3. Determination of Properties

Mechanical properties were determined on injection molded bodies. Determination of density was performed according to DIN EN ISO 1183-1 (A), hardness according to DIN 53505, tensile strength, breaking elongation and elastic moduli according to DIN EN ISO 527, tear propagation resistance according to DIN ISO 34-1, B (b), notched impact strengths according to DIN EN ISO 179-1/1eA and abrasion according to DIN 53516.
The properties for the individual materials are summarized in table 1.

4. Notched Impact Strengths at Low Temperatures

The inventive examples (EB) in table 1 illustrate that the use of a PTHF having average molar weights in the range of 1400-1700 affords materials having a high impact strength at low temperatures. Materials having approximately identical stiffness at 20° C. were to be compared.

Thus for example for the inventive material J a notched impact strength of 117 kJ/m² was measured at −30° C. while for the noninventive material K a notched impact strength of 8 kJ/m² was determined at −30° C.

Similarly, the inventive materials A and E may be compared to the noninventive material D for example. For material A a notched impact strength of 120 kJ/m² was measured at −30° C. while for the noninventive material D a notched impact strength of 9 kJ/m² was determined at −30° C. For material A a notched impact strength of 110 kJ/m² was measured at −20° C. while for the noninventive material D a notched impact strength of 15 kJ/m² was determined at −20° C.

Furthermore, the examples D to I, all having a hard phase fraction of 53%, show that the notched impact strength at −30° C. for the inventive materials (E-I) having average molar weights for the PTHF in the range of 1400-1700 are always above 20 kJ/m². Despite the much lower elastic modulus at 20° C. the noninventive example D is markedly below 20 kJ/m² for notched impact strengths at −30° C.

5. Stiffening at Low Temperatures

The inventive examples (EB) in table 1 illustrate that the use of a PTHF having average molar weights in the range of 1400-1700 affords materials whose stiffness (elastic modulus) increases only moderately at low temperatures. Materials having approximately identical stiffness at 20° C. were to be compared.

Thus for example for the inventive material J an increase in the elastic modulus to 180% is registered from 20° C. to −30° C. while for the noninventive material K an increase to 340% is determined.

Similarly, the inventive material A may be compared to the noninventive material D for example. For the inventive material A an increase in the elastic modulus of 260% is registered from 20° C. to −30° C. while for the noninventive material D an increase in the elastic modulus to 660% is determined.

TABLE 1

| Formulations and properties of materials A-G | | | | | | | |
|---|---|---|---|---|---|---|---|
| Material | A | B | C | D | E | F | G |
| EB inv. Example/VB comp. example | EB | EB | EB | VB | EB | EB | EB |
| HP fraction [%] | 47 | 49 | 51 | 53 | 53 | 53 | 53 |
| Average molar weight of PTHF [Dalton] | 1700 | 1700 | 1700 | 1000 | 1200 | 1400 | 1500 |
| Poly THF 2000 OHN: 56.1 [g] | 37.64 | 36.16 | 34.76 | 0 | 12.83 | 22.52 | 26.54 |
| Poly THF 1000 OHN: 112.2 [g] | 8.06 | 7.74 | 7.44 | 37.09 | 25.58 | 16.85 | 13.24 |
| Lupranat MET [g] | 40.9 | 42.15 | 43.34 | 47.94 | 46.62 | 45.64 | 45.23 |
| Butanediol, 1,4- [g] | 12.31 | 12.85 | 13.37 | 13.87 | 13.87 | 13.89 | 13.89 |
| Density [g/cm³] | 1.14 | 1.14 | 1.15 | 1.17 | 1.16 | 1.16 | 1.16 |
| Hardness [Shore D] | 53 | 54 | 57 | 59 | 59 | 60 | 60 |
| Tensile strength [MPa] | 37 | 42 | 43 | 57 | 42 | 49 | 41 |
| Elongation at break [%] | 370 | 370 | 380 | 430 | 360 | 370 | 330 |
| Tear propagation resistance [kN/m] | 96 | 107 | 114 | 171 | 176 | 171 | 168 |
| Abrasion [mm³] | 40 | 40 | 43 | 32 | 51 | 58 | 50 |
| Elastic modulus at 20° C. [MPa] | 281 | 382 | 435 | 205 | 353 | 528 | 591 |
| Elastic modulus at 0° C. [MPa] | 395 | 514 | 587 | 438 | 556 | 870 | 807 |
| Elastic modulus at −10° C. [MPa] | 477 | 586 | 680 | 608 | 758 | 954 | 902 |
| Elastic modulus at −20° C. [MPa] | 571 | 712 | 809 | 922 | 1169 | 1191 | 1134 |
| Elastic modulus at −30° C. [MPa] | 736 | 885 | 1064 | 1345 | 1301 | 1334 | 1260 |
| Percentage increase in elastic modulus from room temperature to −30° C. | 262 | 231 | 244 | 656 | 368 | 253 | 213 |
| Charpy notched impact strength at −10° C. [kJ/m²] | 107 | 104 | 102 | 175 | 139 | 117 | 114 |
| Charpy notched impact strength at −20° C. [kJ/m²] | 110 | 112 | 114 | 15 | 122 | 118 | 116 |
| Charpy notched impact strength at −30° C. [kJ/m²] | 120 | 120 | 124 | 9 | 25 | 113 | 121 |
| Colorability with 2% color masterbatch 1 (*) | 3 | 3 | 3 | 1 | 1 | 1 | 2 |
| Colorability with 2% color masterbatch 2 (*) | 3 | 3 | 3 | 1 | 1 | 1 | 2 |

| Formulations and properties of materials H-N | | | | | | | |
|---|---|---|---|---|---|---|---|
| Material | H | I | J | K | L | M | N |
| EB inv. Example/VB comp. example | EB | EB | EB | VB | EB | EB | EB |
| HP fraction [%] | 53 | 53 | 57 | 60.5 | 62.5 | 72 | 60.5 |
| Average molar weight of PTHF [Dalton] | 1600 | 1700 | 1700 | 1000 | 1700 | 1700 | 1400 |
| Poly THF 2000 OHN: 56.1 [g] | 30.13 | 33.34 | 30.54 | 0 | 26.63 | 19.83 | 18.93 |
| Poly THF 1000 OHN: 112.2 [g] | 10.05 | 7.14 | 6.54 | 31.38 | 5.7 | 4.24 | 14.2 |
| Lupranat MET [g] | 44.84 | 44.53 | 46.9 | 52.25 | 50.2 | 55.95 | 49.92 |
| Butanediol, 1,4- [g] | 13.88 | 13.89 | 14.92 | 15.99 | 16.37 | 18.88 | 15.85 |
| Density [g/cm³] | 1.15 | 1.15 | 1.16 | 1.20 | 1.18 | 1.20 | n.d. |
| Hardness [Shore D] | 58 | 57 | 62 | 75 | 66 | 74 | n.d. |

TABLE 1-continued

| | | | | | | | |
|---|---|---|---|---|---|---|---|
| Tensile strength [MPa] | 42 | 43 | 43 | 65 | 44 | 51 | n.d. |
| Elongation at break [%] | 330 | 360 | 310 | 380 | 260 | 180 | n.d. |
| Tear propagation resistance [kN/m] | 168 | 126 | 155 | 220 | 183 | 238 | n.d. |
| Abrasion [mm$^3$] | 48 | 47 | 52 | 22 | 75 | 113 | n.d. |
| Elastic modulus at 20° C. [MPa] | 550 | 561 | 803 | 774 | 1101 | 1597 | n.d. |
| Elastic modulus at 0° C. [MPa] | 731 | 700 | 943 | 1370 | 1354 | 2000 | n.d. |
| Elastic modulus at −10° C. [MPa] | 783 | 816 | 1043 | 1841 | 1431 | 2256 | n.d. |
| Elastic modulus at −20° C. [MPa] | 940 | 927 | 1170 | 2171 | 1606 | 2525 | n.d. |
| Elastic modulus at −30° C. [MPa] | 1137 | 1286 | 1439 | 2642 | 1980 | 2835 | n.d. |
| Percentage increase in elastic modulus from room temperature to −30° C. | 206 | 229 | 179 | 341 | 179 | 178 | n.d. |
| Charpy notched impact strength at −10° C. [kJ/m$^2$] | 105 | 105 | 114 | 9 | 91 | n.d. | n.d. |
| Charpy notched impact strength at −20° C. [kJ/m$^2$] | 107 | 118 | 122 | 9 | 82 | n.d. | n.d. |
| Charpy notched impact strength at −30° C. [kJ/m$^2$] | 119 | 123 | 117 | 8 | 31 | n.d. | n.d. |
| Colorability with 2% color masterbatch 1 | 3 | 3 | 5 | 1 | 5 | 5 | 1 |
| Colorability with 2% color masterbatch 2 | 3 | 3 | 5 | 1 | 5 | 5 | 1 | n.d.—not determined
(*) Assessment of colorability:
1—very good
2—good
3—satisfactory
4—adequate
5—inadequate

CITED LITERATURE

WO 2007/118827A1
Kunststoffhandbuch, volume VII, edited by Vieweg and Höchtlen, Carl Hanser Verlag, Munich 1966 (p. 103-113)
EP 0 922 552 A1
DE101 03 424 A1
WO 2006/072461 A1

The invention claimed is:

1. A process for producing a ski shoe or a part of a ski shoe, the process comprising:
   producing a ski shoe or a part of a ski shoe from a thermoplastic polyurethane (TPU-1) obtained by reaction of an isocyanate composition (IZ) comprising 4,4'-diphenylmethanediisocyanate (MDI) with a polyol composition (PZ), comprising a polyol (P1) and a chain extender (KV1),
   wherein the polyol (P1) comprises a polytetrahydrofuran having an average molecular weight Mn in a range of from 1300 to 1700 g/mol,
   wherein the chain extender (KV1) comprises 1,3-propanediol, 1,4-butanediol, or 1,6-hexanediol, and
   wherein the thermoplastic polyurethane has a hard phase fraction greater than 0.40, and wherein the hard phase fraction is defined by formula (I)

$$\text{Hard phase fraction} = \left\{ \sum_{x=1}^{x} \left[ (m_{KVx}/M_{KVx}) * M_{Iso} + m_{KVx} \right] \right\} / m_{ges}, \quad (I)$$

wherein
$M_{KVx}$ is molar mass of the chain extender x in g/mol,
$m_{KVx}$ is mass of the chain extender x in g,
$M_{Iso}$ is molar mass of the isocyanate in g/mol,
$m_{ges}$ is total mass of all starting materials in g, and
x is a number of chain extenders.

2. The process of claim 1, wherein the thermoplastic polyurethane (TPU-1) is processed by injection molding in the producing.

3. The process of claim 1, wherein the chain extender (KV1) is 1,4-butanediol.

4. The process of claim 1, wherein the thermoplastic polyurethane of the ski shoe or the part has a Charpy notched impact strength at −30° C. according to DIN EN ISO 179-1/1 eA of greater than 10 kJ/m$^2$.

5. The process of claim 1, wherein the thermoplastic polyurethane has an elastic modulus of greater than 200 MPa.

6. The process of claim 1, wherein the polyol (P1) comprises a polytetrahydrofuran having an average molecular weight Mn in a range of from 1400 to 1700 g/mol.

7. The process of claim 6, wherein the chain extender (KV1) is 1,4-butanediol.

8. The process of claim 1, wherein the thermoplastic polyurethane has a hard phase fraction greater than 0.5.

9. The process of claim 1, wherein the thermoplastic polyurethane has an elastic modulus of 400 to 1,100 MPa.

10. The process of claim 1, wherein the thermoplastic polyurethane has an elastic modulus of 800 to 1,000 MPa.

11. The process of claim 1, wherein the thermoplastic polyurethane of the ski shoe or the part has a Charpy notched impact strength at −30° C. according to DIN EN ISO 179-1/1 eA of greater than 30 kJ/m$^2$.

* * * * *